(12) United States Patent
McCormick et al.

(10) Patent No.: US 12,157,536 B2
(45) Date of Patent: Dec. 3, 2024

(54) PORTABLE CONVEYANCE WITH DUAL FUNCTION RACK AND STAND

(71) Applicant: Probity IP LLC, Holdrege, NE (US)

(72) Inventors: Robert McCormick, Holdrege, NE (US); Zhiming Ye, Holdrege, NE (US); Xiaojun Wang, Holdrege, NE (US); Liuhai Zhao, Holdrege, NE (US); Wei Chang, Buffalo Grove, IL (US); Zhenghua Kong, Vernon Hills, IL (US)

(73) Assignee: Probity IP LLC, Holdrege, NE (US)

( * ) Notice: Subject to any disclaimer, the term of this patent is extended or adjusted under 35 U.S.C. 154(b) by 0 days.

(21) Appl. No.: 18/175,167

(22) Filed: Feb. 27, 2023

(65) Prior Publication Data

US 2024/0051636 A1    Feb. 15, 2024

Related U.S. Application Data

(63) Continuation of application No. 16/942,298, filed on Jul. 29, 2020, now Pat. No. 11,591,038.

(51) Int. Cl.
| | |
|---|---|
| *B62K 19/40* | (2006.01) |
| *B62H 1/00* | (2006.01) |
| *B62K 15/00* | (2006.01) |
| *B62K 21/00* | (2006.01) |

(52) U.S. Cl.
CPC ............ *B62K 15/006* (2013.01); *B62H 1/00* (2013.01); *B62K 19/40* (2013.01); *B62K 21/00* (2013.01)

(58) Field of Classification Search
CPC ...... B62K 15/006; B62K 19/40; B62K 21/00; B62K 2015/005; B62K 3/002; B62H 1/00; B62H 1/02; B62H 1/04; B62H 3/10; B62H 2700/00; B62J 7/04; B62J 7/06; B62J 7/02; B62J 9/21; B62J 9/23; B62J 9/24; B62J 9/27
See application file for complete search history.

(56) References Cited

U.S. PATENT DOCUMENTS

| | | | | |
|---|---|---|---|---|
| 513,243 | A * | 1/1894 | McGinnis ................ | B62H 1/00 280/302 |
| 630,068 | A * | 8/1899 | Neumann ................ | B62H 1/00 280/297 |
| 679,765 | A * | 8/1901 | Manson .................. | B62H 1/00 280/302 |
| 711,462 | A * | 10/1902 | Beale ....................... | B62H 1/00 280/302 |
| 745,185 | A | 11/1903 | Hightower | |

(Continued)

FOREIGN PATENT DOCUMENTS

| | | |
|---|---|---|
| CN | 2936900 Y | 8/2007 |
| CN | 101102929 A | 1/2008 |

(Continued)

*Primary Examiner* — Steve Clemmons
(74) *Attorney, Agent, or Firm* — Fish & Richardson P.C.

(57) ABSTRACT

This specification relates to portable conveyances, and in particular to a dual-function apparatus that functions as a rack in a first attachment position on the portable conveyance when the portable conveyance is in an unfolded position, and that functions as a stand in a second attachment position on the portable conveyance when the portable conveyance is in a folded position.

5 Claims, 9 Drawing Sheets

(56) References Cited

U.S. PATENT DOCUMENTS

| | | | | |
|---|---|---|---|---|
| 946,037 | A * | 1/1910 | Harley | B62H 1/00 280/302 |
| 1,042,877 | A * | 10/1912 | Blair | B62H 1/00 280/302 |
| 3,572,758 | A * | 3/1971 | Lee | A63B 69/16 482/61 |
| 5,417,629 | A * | 5/1995 | Phipps | B62H 1/04 482/61 |
| 5,931,360 | A | 8/1999 | Reichert | |
| 6,561,467 | B1 | 5/2003 | Farsio | |
| 7,341,270 | B1 | 3/2008 | Scholz | |
| 8,764,061 | B2 * | 7/2014 | Apthorpe | B62H 1/02 280/87.021 |
| 8,910,842 | B2 | 12/2014 | Dodman et al. | |
| 9,302,728 | B1 | 4/2016 | Yang | |
| 9,376,158 | B1 | 6/2016 | McCormick et al. | |
| 9,604,688 | B1 * | 3/2017 | Yang | B62K 3/10 |
| 11,267,527 | B2 * | 3/2022 | Ho | B62K 3/04 |
| 11,433,961 | B2 | 9/2022 | Sela | |
| 2003/0071439 | A1 * | 4/2003 | Haugen | B62J 9/24 280/295 |
| 2006/0169861 | A1 * | 8/2006 | Williams | B62K 3/002 248/346.4 |
| 2009/0289091 | A1 | 11/2009 | Ulrich | |
| 2014/0061267 | A1 * | 3/2014 | Turner | B62K 3/002 224/413 |
| 2015/0210340 | A1 | 7/2015 | Wang | |
| 2017/0021885 | A1 | 1/2017 | Montague | |
| 2020/0361560 | A1 | 11/2020 | Claes | |

FOREIGN PATENT DOCUMENTS

| | | | | |
|---|---|---|---|---|
| CN | 208602405 | U * | 3/2019 | |
| DE | 20101522 | U1 * | 5/2001 | B62H 1/00 |
| DE | 202019103766 | U1 * | 8/2019 | |
| EP | 1201533 | | 12/2006 | |
| FR | 2870506 | B1 * | 5/2008 | |
| FR | 3095635 | A1 | 11/2020 | |
| GB | 2595916 | A | 12/2021 | |
| KR | 20020065258 | A | 8/2002 | |
| KR | 20130097865 | A | 9/2013 | |
| WO | WO 2021258151 | A1 | 12/2021 | |

* cited by examiner

PORTABLE CONVEYANCE WITH DUAL FUNCTION RACK AND STAND

CROSS-REFERENCE TO RELATED APPLICATIONS

This application is a continuation application of, and claims priority to, U.S. patent application Ser. No. 16/942,298, now U.S. Pat. No. 11,591,038, filed on Jul. 29, 2020. The disclosure of the foregoing application is incorporated herein by reference in its entirety for all purposes.

BACKGROUND

Portable conveyances are very popular forms of transportation. Initially such conveyances were recreational in nature. However, with the advent of environmental awareness and a concomitant acceptance of alternative forms of transportation, many people now use portable conveyances for portions of their commutes to and from their working locations. Portable conveyances are especially popular for "first and last" mile commuting. For example, a person may use a portable conveyance to travel from her home to a metro rail station, and then collapse the portable conveyance into a storage and towing configuration that allows the user to more easily transport the conveyance onto the rail car. The person may thereafter use the portable conveyance to travel from her destination rail station to her place of work. Finally, while at work, the person may store the conveyance in the collapsed configuration in her office during the work day.

Existing portable conveyances still have several drawbacks, however. For example, many of the devices are heavy and tow on one wheel, and the user must "balance" the conveyance while towing. Thus, when a user tows the conveyance for a long distance, the user may become fatigued. Alternatively, some portable conveyances have two rear drive wheels that also serve as tow wheels. This configuration, however, has a larger rear-wheel footprint than for single rear-wheel portable conveyances, which, in turn, requires more storage space.

Additional, the user typically must lean the conveyance against a resting surface, such as a wall, when the conveyance is stored. As the conveyance is typically soiled from dirt, rain, etc., and is also heavy, leaning the conveyance against a wall will eventually soil the wall and damage the surface of the wall.

Finally, small portable conveyances have little or no capability to transport cargo, such as a small box, when the person is riding the conveyance.

SUMMARY

This specification relates to portable conveyances, and in particular to a dual-function apparatus that functions as a rack in a first attachment position on the portable conveyance when the portable conveyance is in an unfolded position, and that functions as a stand in a second attachment position on the portable conveyance when the portable conveyance is in a folded position.

In general, one innovative aspect of the subject matter described in this specification can be embodied in an apparatus that includes a deck defining a longitudinal axis and first and second ends, disposed along the longitudinal axis; a front wheel proximately disposed to the first end of the deck and a rear wheel proximately disposed to the second end of the deck, and wherein the deck defines a substantially planar support surface upon which a rider of the personal conveyance is supported while riding the personal conveyance; a steering assembly having a first end and a second end, wherein: a steering handle is attached to the second end of the steering assembly, the first end the steering assembly is attached proximate to the first end of the deck by a foldable attachment that has a folded position and an unfolded position, and wherein: the foldable attachment secures the steering assembly in a drive position when in the unfolded position, and the foldable attachment secures the steering assembly in a separate, stowed position when in the folded positon; and a rack assembly that is attached proximate to one of the front wheel or rear wheel by multi-position attachment system that facilitates a first attachment position and a second attachment position, the rack assembly comprising a support structure that defines a planar region, wherein: the rack assembly, when attached in the first attachment position and the foldable attachment secures the steering assembly in the drive position and the front wheel and the rear wheel of the portable conveyance are positioned on a flat surface, the rack assembly is positioned such that the planar region, relative to the flat surface, is above the wheel to which the rack assembly is proximately attached; and the rack assembly, when attached in the second attachment position and the foldable attachment secures the steering assembly in the folded position, the rack assembly is positioned such that the planar region, relative to the flat surface, is below the wheel to which the rack assembly is proximately attached and the portable conveyance may rest in an upright position with the planar region of the rack assembly serving as a base.

In general, one innovative aspect of the subject matter described in this specification can be embodied in a rack assembly that includes a support structure that defines a planar region; a first rack wheel and a second rack wheel along an axis of rotation that runs parallel to the planar region; a first mounting apparatus extending from a first side of the support structure and a second mounting apparatus extending from a second side of the support structure that is opposite the first side of the support structure and that is operable to proximately attach the rack assembly to one of a front wheel or rear wheel of a portable conveyance, wherein: the first mounting apparatus defines a first interlock structure that can interlock in a first position and a second, separate position on first side of one of the front wheel or rear wheel of the portable conveyance, the second mounting apparatus defines a second interlock structure that can interlock in the first position and the second, separate position on a second side of one of the front wheel or rear wheel of the portable conveyance; and wherein when the first and second interlock structures are interlocked in the first position, and the front wheel and the rear wheel of the portable conveyance are on a flat surface, the rack assembly is positioned such that the planar region, relative to the flat surface, is above the wheel to which the rack assembly is proximately attached; and when the first and second interlock structures are interlocked in the second position, the rack assembly is positioned such that the planar region, relative to the flat surface, is below the wheel to which the rack assembly is proximately attached when the portable conveyance rests in an upright position with the planar region of the rack assembly serving as a base.

Particular embodiments of the subject matter described in this specification can be implemented so as to realize one or more of the following advantages. The dual function apparatus functions as a rack when attached at a first attachment position when the conveyance is in an unfolded positon, and when attached at a second attachment position when the conveyance is in a folded positon, functions as a stand and, if equipped with tow wheels, a towing assembly. When in the folded position, by use of the dual function apparatus, the conveyance is in a multi-point towing configuration that results in a balanced, stable load, which reduces user fatigue that results from resisting rotational moments of single-point towing devices. The device may be stored upright on a horizontal surface without the need of lateral support, which reduces the storage footprint that would be required with lateral support. Furthermore, marring, scuffing and soiling of a lateral support surface are eliminated. Additionally, when in the unfolded position, the portably conveyance, by use of the dual function apparatus, has a rack upon which cargo may be secured for transport.

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements. To avoid congestion in the drawings and for brevity of description, reference numbers may not be repeated in subsequent drawings and descriptions of elements previously described may be omitted in subsequent drawings.

DETAILED DESCRIPTION

A dual-function apparatus is used with a portable conveyance. The dual-function apparats functions as a rack in a first attachment position on the portable conveyance when the portable conveyance is in an unfolded position, and functions as a stand in a second attachment position on the portable conveyance when the portable conveyance is in a folded position. In an optional implementation, the dual-function apparatus includes a pair of wheels that enable the portable conveyance to be towed when in the folded position.

As will be described in more detail below, the dual function apparatus can be in the form of a rack assembly that provides a planar surface upon where cargo may be secured when the conveyance is in the unfolded position. The rack assembly frame has a pair of towing wheels on one side, and when the conveyance is in the folded position, the conveyance may towed on the tow wheels, or stored upright by use of the planar surface of the rack.

When the conveyance is in the unfolded position, the rack assembly is attached to the conveyance at a first attachment position. Conversely, when the conveyance is in the folded position, the rack assembly is attached to the conveyance at a second attachment position. In one implementation, both the first and second attachment positions may be near the front wheel of the conveyance. In another implementation, both the first and second attachment positions may be near the rear wheel of the conveyance. In yet another implementation, first attachment position may be near one of the front wheel or the rear wheel, while the second attachment position may be near one of the rear wheel or front wheel.

These features and additional features are described in more detail below.

FIGS. 1-6 are views of a first implementation of a portable conveyance 100 in which the rack assembly may be mounted in either the first attachment position or the second attachment position proximate the front wheel.

Figure 1A:
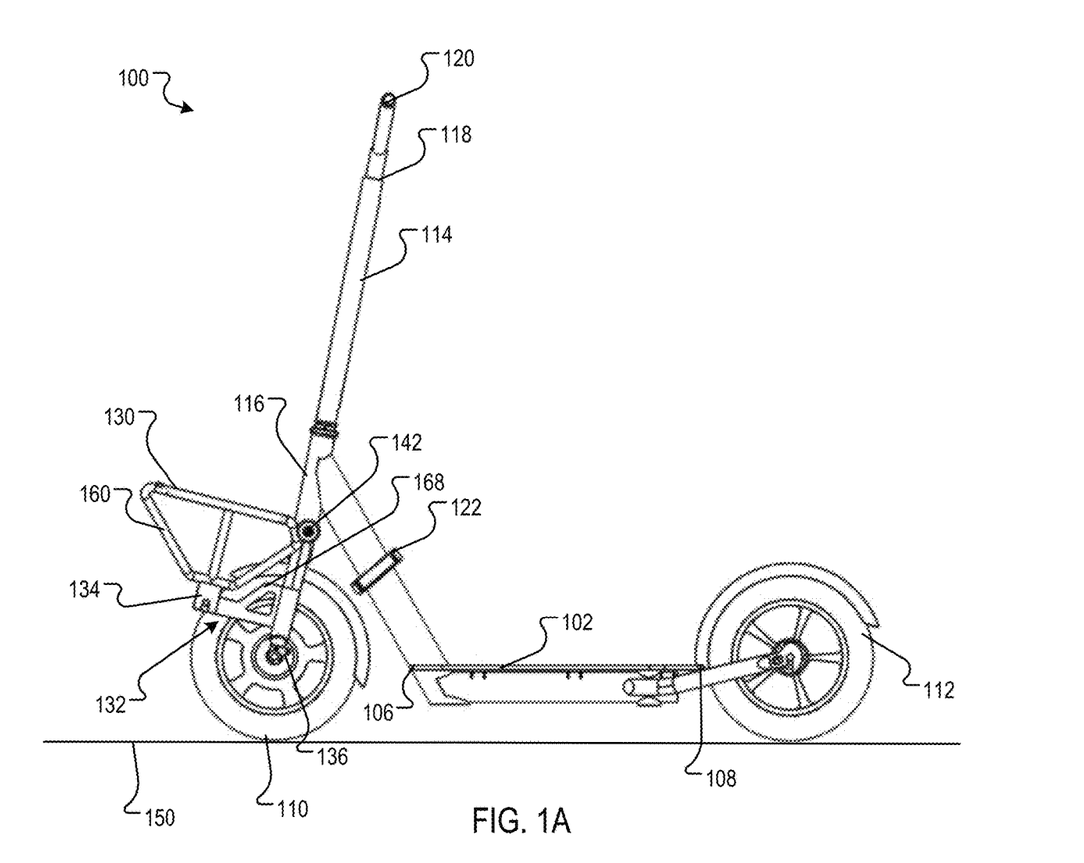
FIG. 1A is a side view of a portable conveyance in an unfolded position with a dual function apparatus attached proximate to a front wheel in a first attachment position.

The conveyance 100 includes a deck 102 defining a longitudinal axis 104. The deck 102 has a first end 106 and a second end 106 disposed along the longitudinal axis 104. A front wheel 110 is proximately disposed from the first end 106 of the deck 102 and a rear wheel 112 is proximately disposed from a second end 108 of the deck 102. The deck 102 defines a substantially planar support surface 113 upon which a rider of the personal conveyance 100 is supported while riding the personal conveyance 100.

A steering assembly 114 has a first end 116 and a second end 118, and a steering handle 120 is attached to the second end 118 of the steering assembly 114. The first end 116 of the steering assembly 114 is attached proximate to the first end 106 of the deck 102 by a foldable attachment 122 that has a folded position and an unfolded position. The foldable attachment 122 secures the steering assembly 114 in a drive position when in the unfolded position, as shown in FIGS. 1A, 1B, 2, and 3, and secures the steering assembly 114 in a separate, stowed position when in the folded position, as shown in FIGS. 4A, 4B, 5 and 6. Any appropriate folding mechanism may be used.

A rack assembly 130 is attached proximate to one of the front wheel 110 or rear wheel 112 by multi-position attachment system 132 that facilitates a first attachment position 134 and a second attachment position 136. Generally, the attachment system 132 may include reciprocal mounting devices located on the rack assembly 130 and the conveyance 100 frame. If the frame assembly 130 can be mounted proximate to both the front wheel 110 and the rear wheel 112, depending on the folded and unfolded position, then the attachment system 132 include elements proximate to both the front wheel 110 and the rear wheel 112. In the implementation of FIG. 1, however, the attachment system 132 is distributed proximate to the front wheel 110, and not the rear wheel 112. In implementations in which the conveyance 100 has a seat, the rack assembly 130 is separate from the seat. The attachment system 132 is described in more detail below.

Figure 3:
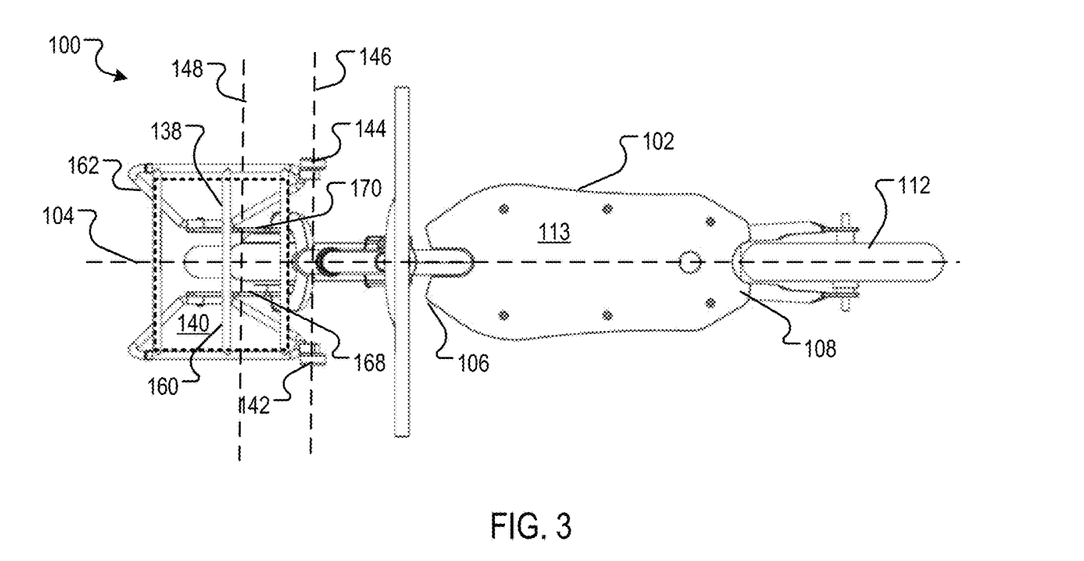
FIG. 3 is a top view of the portable conveyance of FIG. 1 in the unfolded position.

The rack assembly 130 includes a support structure 138 that defines a planar region 140, as illustrated by the phantom plane 140 in FIG. 3. In implementations that include rack wheels, a first rack wheel 142 and a second rack wheel 144 are distributed along an axis of rotation 146 that runs parallel to the planar 140 region and parallel to an axis of rotation 148 of the wheel to which the rack assembly 130 is proximately attached, which, in this example implementation, is the front wheel 110.

The rack assembly 130, when attached in the first attachment position 132 and when the foldable attachment 122 secures the steering assembly 114 in the drive position, and when the front wheel 110 and the rear wheel 112 of the portable conveyance are positioned on a flat surface 150, is positioned such that the planar region 140, relative to the flat surface 150, is above the wheel to which the rack assembly 130 is proximately attached. The relative positioning is illustrate in FIGS. 1A and 1B, for example. In this position, the user may ride the conveyance 100 and secure cargo to the rack assembly 130.

Figure 4A:
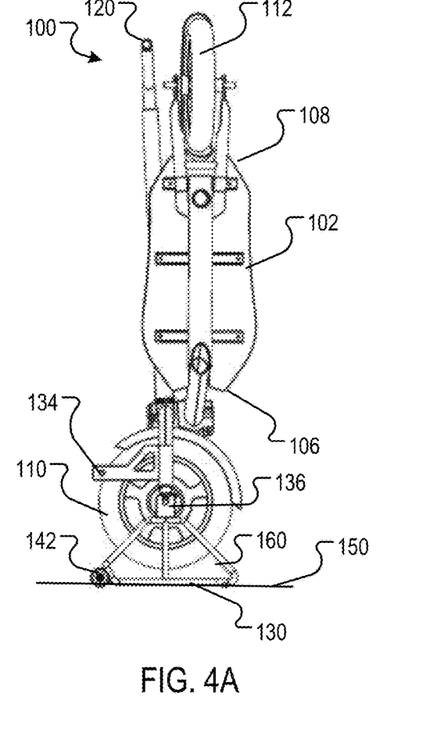
FIG. 4A is a first side view of the portable conveyance of FIG. 1 in a folded position with the dual function apparatus attached proximate to the front wheel in a second attachment position.
Figure 4B:
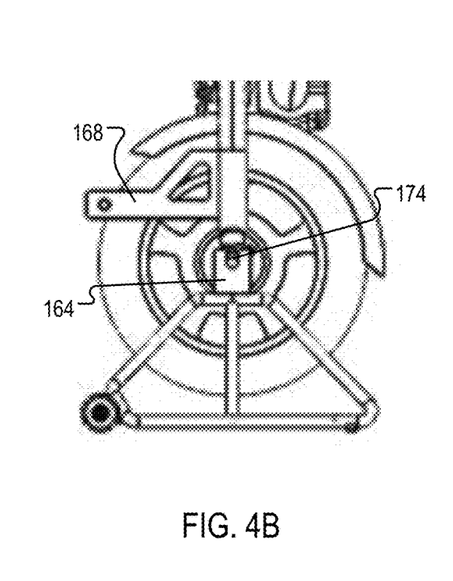
FIG. 4B is a more detailed view of one implementation of the multi-position attachment system when the rack assembly is in the second attachment position.
Figure 5:
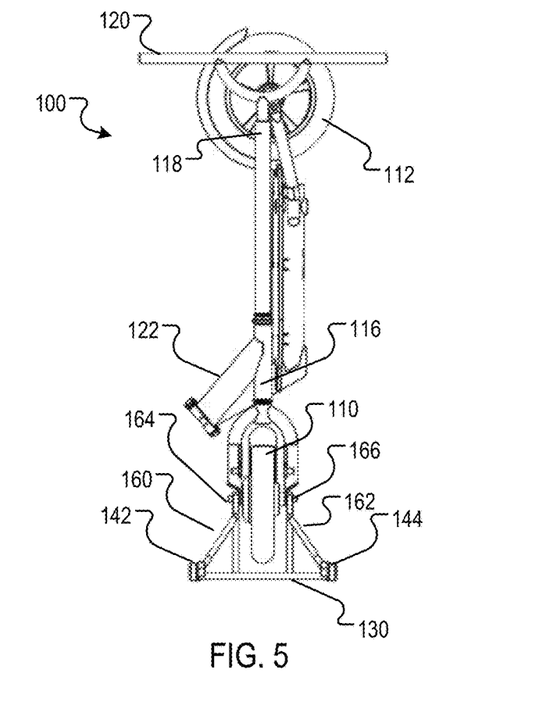
FIG. 5 is a second side view of the portable conveyance of FIG. 4 in the folded position.

The rack assembly 130, when attached in the second attachment position 136 and the foldable attachment 120 secures the steering assembly 114 in the folded position, is positioned such that the planar region 140, relative to the flat surface 150, is below the wheel to which the rack assembly 130 is proximately attached. The relative positioning is illustrated in FIGS. 4A and 4B, for example. In this configuration, the portable conveyance 100 may rest in an upright position with the planar region 140 of the rack assembly 130 serving as a base, as illustrate in FIG. 5.

Figure 6:
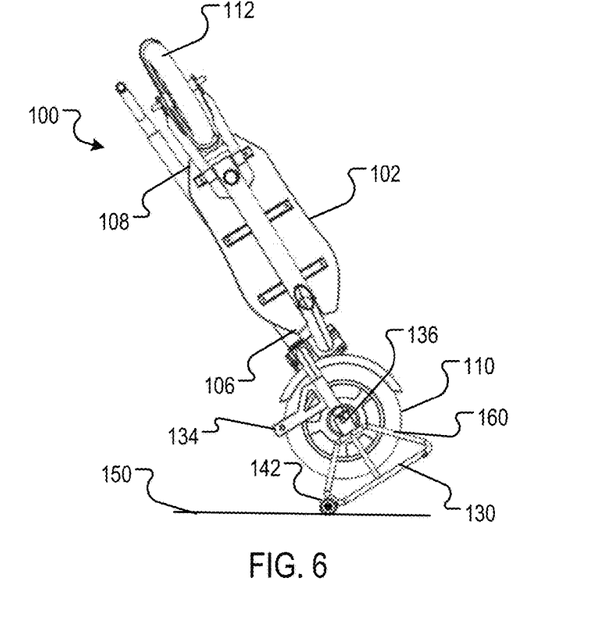
FIG. 6 is another first side view of the portable conveyance, where the portable conveyance is tilted in a towing position.
Figure 7:
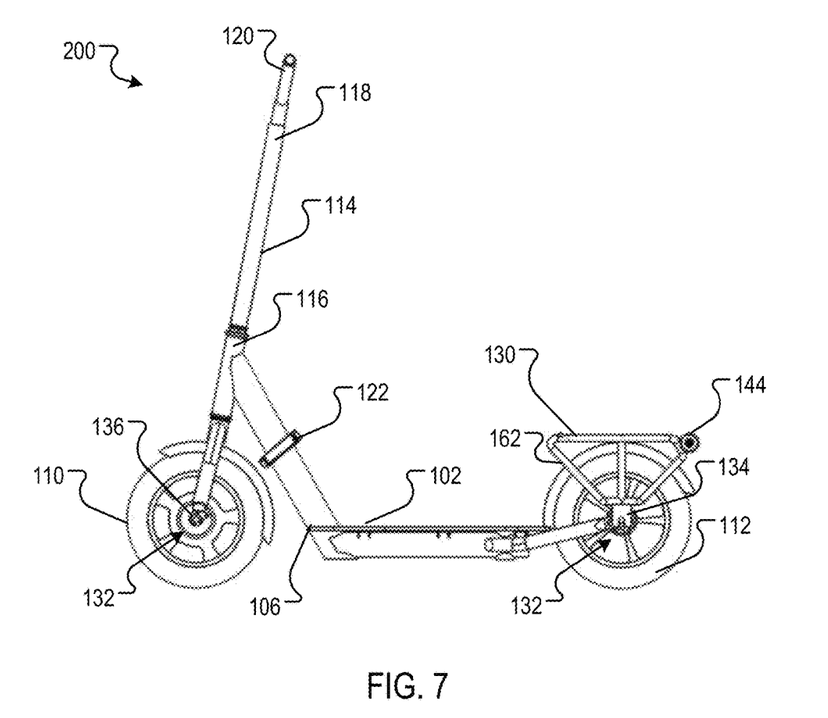
FIG. 7 is a side view of another implementation of the portable conveyance in an unfolded position with a dual function apparatus attached proximate to a rear wheel in a first attachment position.
Figure 8:
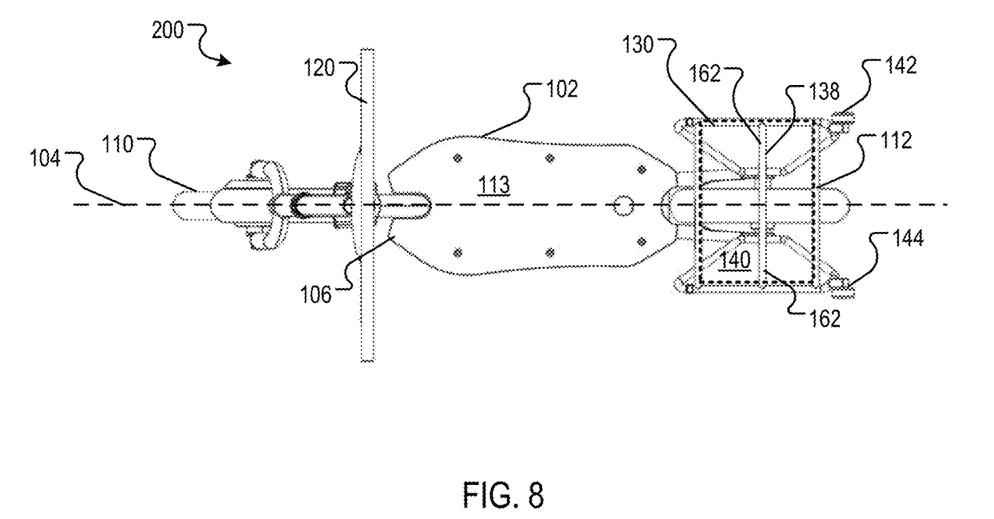
FIG. 8 is a top view of the portable conveyance of FIG. 7.
Figure 9:
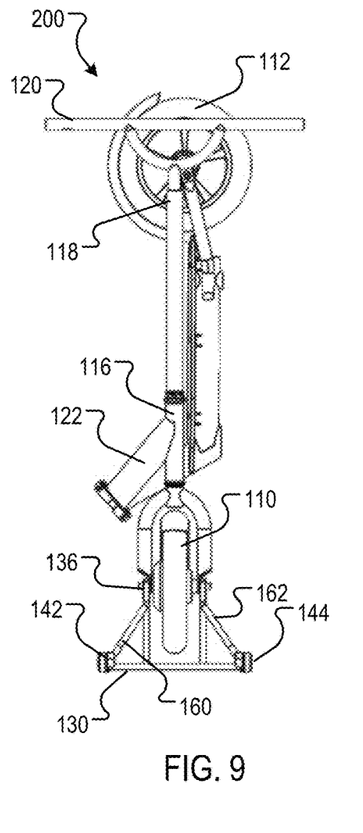
FIG. 9 is a first side view of the portable conveyance of FIG. 7 in a folded position with the dual function apparatus attached proximate to the front wheel in a second attachment position.
Figure 10:
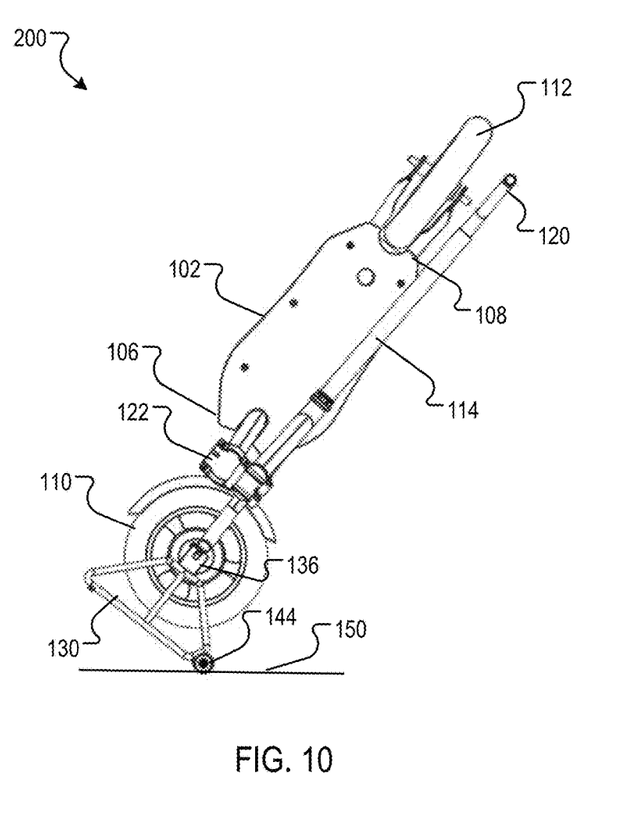
FIG. 10 is another first side view of the portable conveyance, where the portable conveyance is tilted in a towing position.

The conveyance 100 may also be tilted and towed by use of the tow wheels 142 and 144, as illustrated in FIG. 6. For example, when the steering assembly 114 is in the stowed position, the portable conveyance 100 may be tilted from the upright position to a towing position, and in the towing position the portable conveyance 100 may be roll on the flat surface 150 by the first rack wheel 142 and the second rack wheel 144.

While the the first rack wheel 142 is positioned on a first side of the wheel to which the rack assembly 130 is attached, and the second rack wheel 144 is positioned on a second side of the wheel to which the rack assembly 130 is attached, other configurations are possible. For example, depending on the resulting position of a tow point of the conveyance in the folded position, the tow wheels 142 and 144 may be on a same side of a conveyance wheel. For example, if the handle 120 is the tow point, and the conveyance frame is such that the handle is rotated 90 degrees from the position illustrated in FIGS. 5 and 6, then the rack assembly 130 may have tow wheels 142 and 144 on a single side of the wheel 110.

In the example implementation of FIGS. 1A-6, the multi-position attachment system 132 includes a first mounting apparatus 160 extending from a first side of the support structure 138 and a second mounting apparatus 162 extending from a second side of the support structure 138 that is opposite the first side of the support structure 138. The first mounting apparatus 160 defines a first interlock structure 164, and the second mounting apparatus 162 defines a second interlock structure 166. In the example illustrate in FIG. 1B, the interlock structures 164 and 166 are tabs with receiving slots to receive a reciprocal tab with an interlocking alignment pin. Any other appropriate interlocking device can also be used.

A first reciprocal interlock structure 168 is positioned on a first side of front wheel 110, and a second reciprocal interlock structure 170 is positioned on a second side of the front wheel 110. In the implementation of FIGS. 1-6, the reciprocal interlock structures 168 and 170 are in the form of metal brackets on either side of the front wheel 110.

Figure 1B:
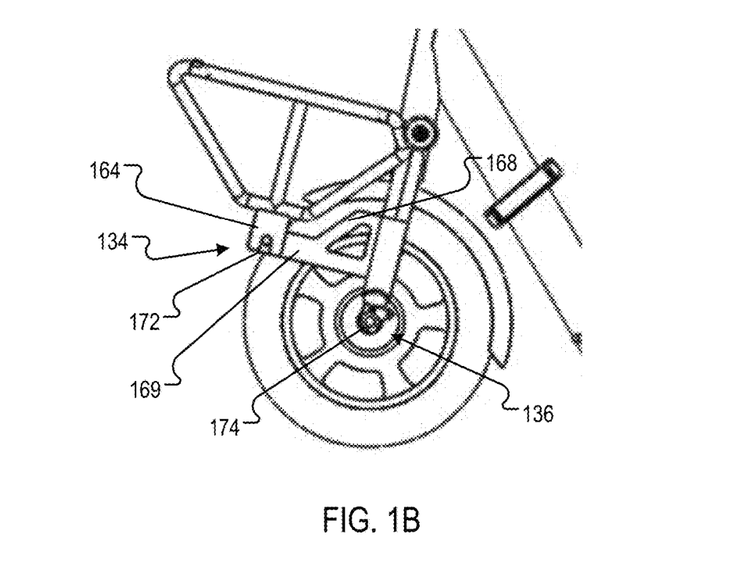
FIG. 1B is a more detailed view of one implementation of a multi-position attachment system when the rack assembly is in the first attachment position.
Figure 2:
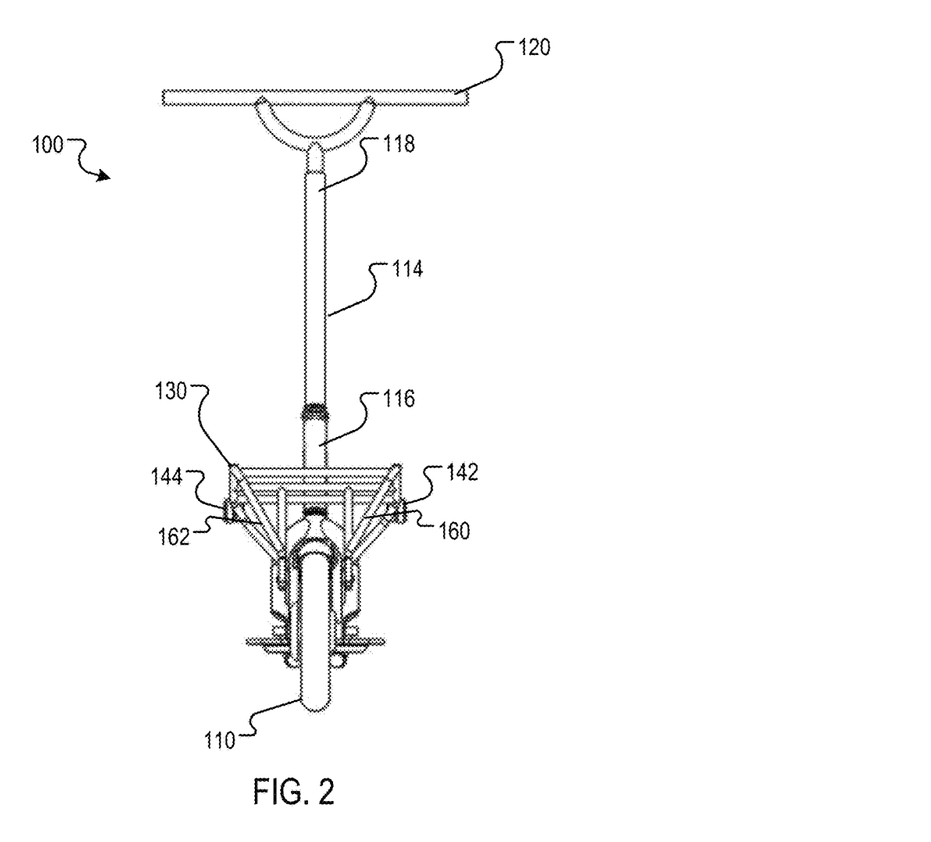
FIG. 2 is a front view of the portable conveyance of FIG. 1 in the unfolded position.

The first interlock structure 164 and the first reciprocal interlock structure 168 interlock in a first interlock position 172 and in a second interlock position 174 that is separate from the first interlock position 172. Likewise, the second interlock structure 166 and the second reciprocal interlock structure 170 also interlock in the first interlock position 172 and in the second interlock position 174. The first interlock position 172 is illustrated in FIG. 1B, and the second interlock position is illustrated in FIG. 4B. As illustrated in FIG. 4B, the second interlock position is near the axis of the front wheel 110, and as illustrated in FIG. 4A, the first interlock position offset from the axis of the front wheel 110 by the arm 169 that extends outward relative to the axis of the front wheel 110.

When the first and second interlock structures 164 and 166 and the first and second reciprocal interlock structures 168 and 170 are respectively interlocked in the first interlock position 172, the rack assembly 130 is attached in the first attachment position 134, as shown in FIG. 1B. Conversely, when the first and second interlock structures 164 and 166 and the first and second reciprocal interlock structures 168 and 170 are respectively interlocked in the second interlock position 174, the rack assembly 130 is attached in the second attachment position 136, as shown in FIG. 4B.

In other implementation, the rack assembly 130 may be rotationally connected proximate to the front wheel 110 (or rear wheel 112), and the rotational connection may have two separate interlock positions. Any appropriate locking system for a rotational connection can be used, such as a spring tension pin that interlocks into detents or holes. The rotational attachment enables attachment of the rack assembly 130 relative to the front wheel 110 (or, alternatively, rear wheel 112) so that the rack assembly 130 rotates from the first interlock position 172 (e.g., a first orientation relative to the wheel) to the second interlock position 174 (e.g. a second orientation relative to the wheel).

In yet another implementation, the first and second reciprocal interlock structures may be mounted near the rear wheel 112. In this implementation, when the first and second interlock structures 164 and 166 and the first and second reciprocal interlock structures 168 and 170 are respectively interlocked in the first interlock position 172, the rack assembly 130 is attached in the first attachment position 134 proximate the rear wheel 112. Conversely, when the first and second interlock structures 164 and 166 and the first and second reciprocal interlock structures 168 and 170 are respectively interlocked in the second interlock position 174, the rack assembly 130 is attached in the second attachment position 136 proximate the rear wheel. This configuration can be used when the folding frame of the conveyance 100 is configured to have the conveyance towed by the rear wheel 112 instead of the front wheel 112.

FIGS. 7-10 illustrate another implementation where the rack assembly 130 is in the first attachment position proximate the rear wheel 112, and in the second attachment position proximate the front wheel. The conveyance 200 is similar to the conveyance 100 of FIGS. 1-6, except that the attachment system 132 differs to distribute one attachment position proximate to the front wheel 110 and another attachment position proximate to the rear wheel 112.

Figure 11:
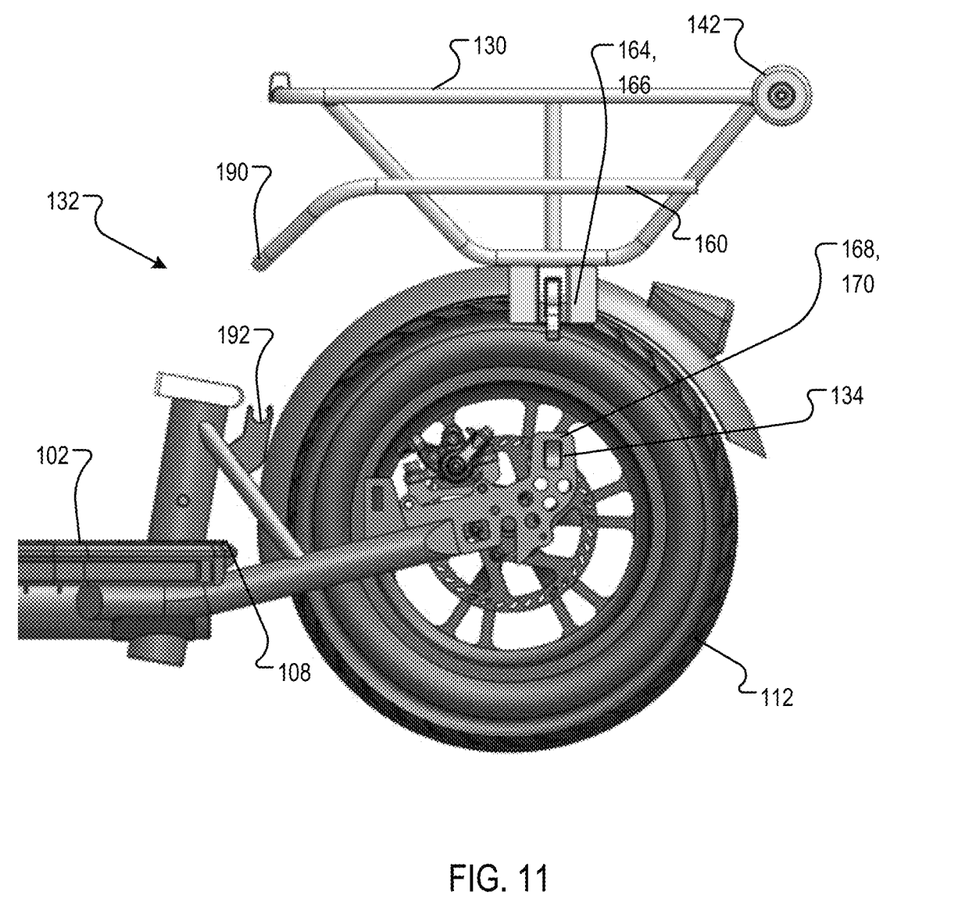
FIG. 11 is a side view of the dual function apparatus disconnected from the first attachment position near the rear wheel of the portable conveyance.
Figure 12:
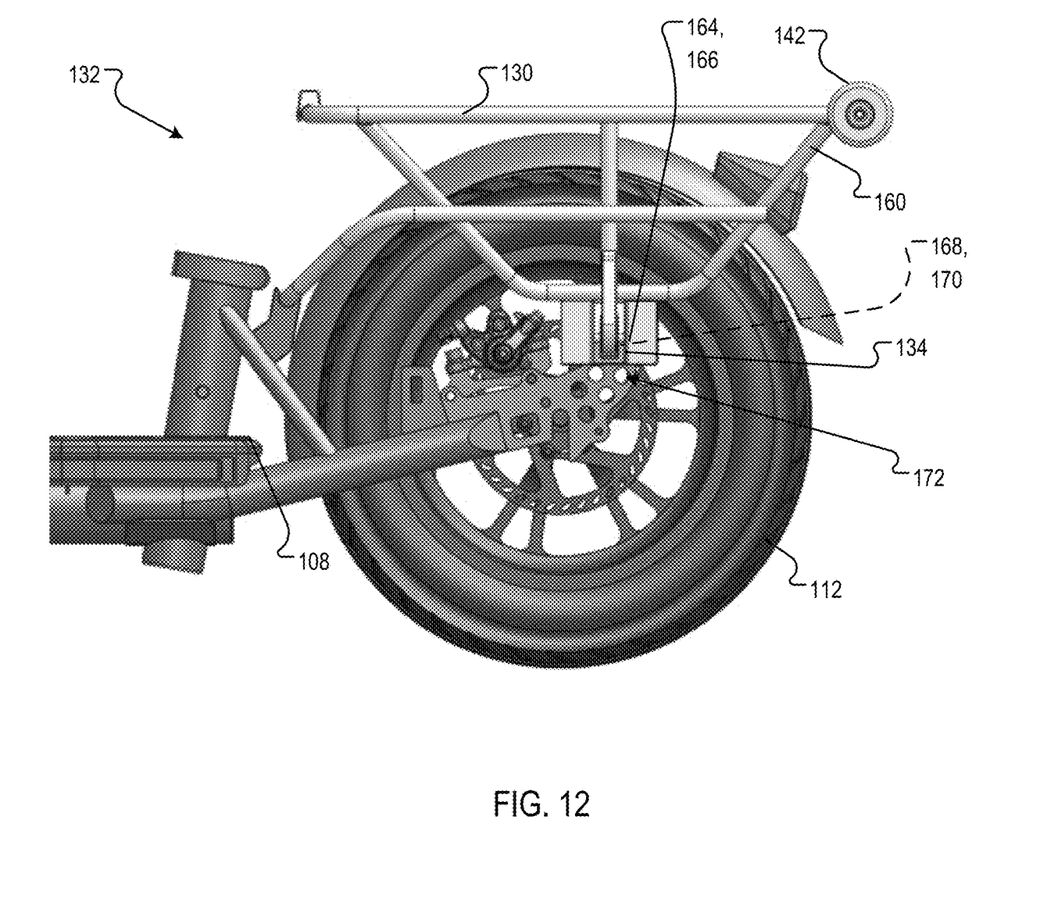
FIG. 12 is a side view of the dual function apparatus connected to the first attachment position near the rear wheel of the portable conveyance.
Figure 13:
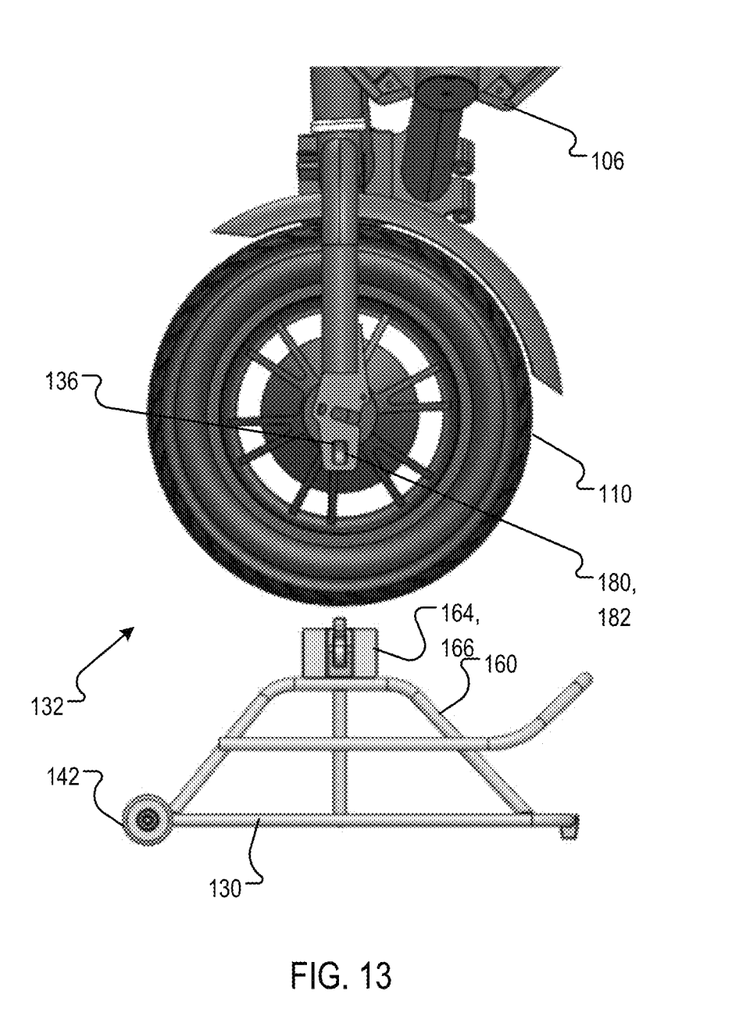
FIG. 13 is a sectional view of the dual function apparatus disconnected from the second attachment position near the front wheel of the portable conveyance.
Figure 14:
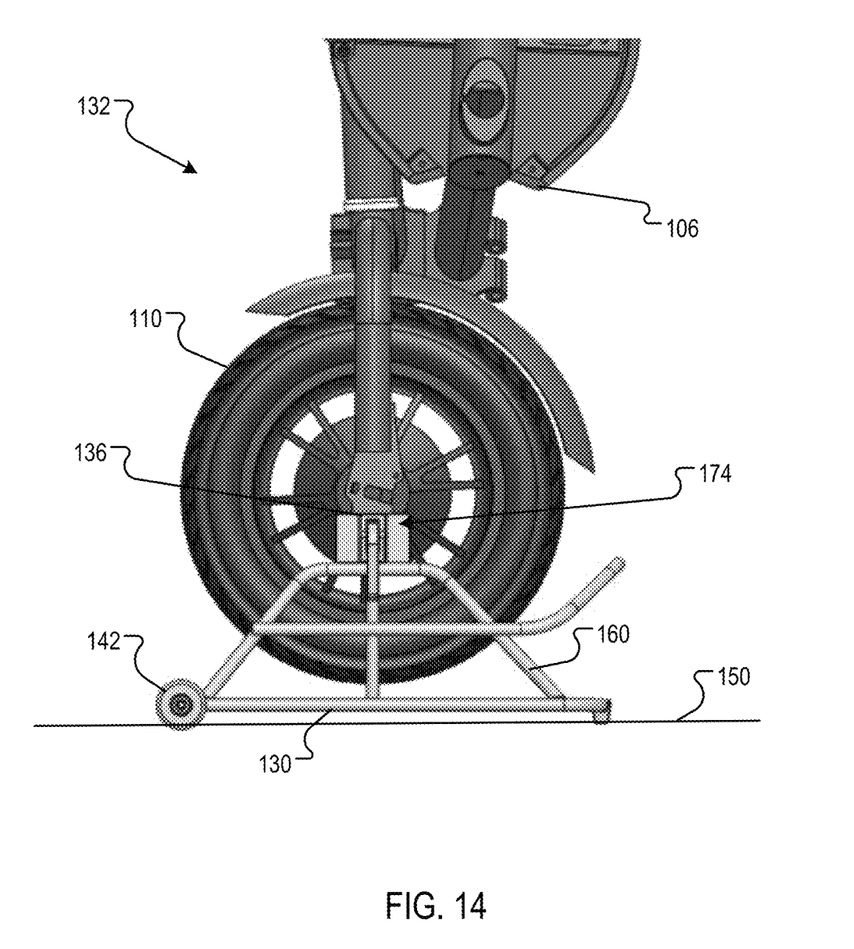
FIG. 14 is a sectional view of the dual function apparatus connected to the second attachment position near the front wheel of the portable conveyance.

FIGS. 11-13 illustrate one example implementation of an attachment system 132 that distributes a first attachment position proximate to the rear wheel 112 and the second attachment position proximate to the front wheel 110. The rack assembly 130 is similar to the rack assembly of FIGS. 1-6. As illustrated in FIG. 11, a first mounting apparatus 160 extends from a first side of the support structure 138 and a second mounting apparatus 162 extends from a second side of the support structure 138. The first mounting apparatus 160 defines a first interlock structure 164, and the second mounting apparatus 162 defines a second interlock structure 166 (as indicated by the detail callout 166 following detail callout 164).

A first reciprocal interlock structure 168 is positioned on a first side of rear wheel 112, and a second reciprocal interlock structure 170 is positioned on a second side of the rear wheel 112 (as indicated by the detail callout 170 following the detail callout 168).

As illustrated in FIG. 13, a third reciprocal interlock structure 180 is positioned on a first side of front wheel 110, and a fourth reciprocal interlock structure 182 is positioned on a second side of the front wheel 110 (as illustrated by the detail callout 182 following detail callout 180). The interlock structures 164 and 166 are slotted tabs with a locking lever. The slotted tabs receive the first and second reciprocal interlock structures 168 and 170 to interlock into the first attachment position, as shown in FIG. 12. The frame assembly 130 may include a distal member 190 that is received in a frame slot 192 for added stability when interlocked in the first interlock position.

Likewise, the interlock structures 164 and 166 receive the third and fourth reciprocal interlock structures 180 and 182 to interlock in the second attachment position, as shown in FIG. 13. In this position, the conveyance 100 may be stood upright on the frame assembly 130, or towed by use of the tow wheels 142 and 144.

In yet another implementation, the position of the frame assembly 130 may be reversed such that it is in the first attachment position proximate to the front wheel 110, in the second attachment position proximate the rear wheel 112. More specifically, in this implementation, when the first and second interlock structures 164 and 166 and the first and second reciprocal interlock structures 168 and 170 are respectively interlocked in the first interlock position 172, the rack assembly 130 is attached in the first attachment position 134 proximate to the front wheel 110. Conversely, when the first and second interlock structures 164 and 166 and the first and second reciprocal interlock structures 180 and 182 are respectively interlocked in the second interlock position 174, the rack assembly 130 is attached in the second attachment position 136 proximate to the rear wheel 112.

While this specification contains many specific implementation details, these should not be construed as limitations on the scope of any inventions or of what may be claimed, but rather as descriptions of features specific to particular embodiments of particular inventions. The dimensions described and/or shown are illustrative, and dimensions may vary from those described and/or shown.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims.

What is claimed is:

1. A portable conveyance, comprising:
a deck defining a longitudinal axis and first and second ends, disposed along the longitudinal axis;
a front wheel proximately disposed to the first end of the deck and a rear wheel proximately disposed to the second end of the deck, and wherein the deck defines a substantially planar support surface upon which a rider of the personal conveyance is supported while riding the personal conveyance;
a steering assembly having a first end and a second end, wherein:
a steering handle is attached to the second end of the steering assembly;
the first end the steering assembly is attached proximate to the first end of the deck by a foldable attachment that has a folded position and an unfolded position, and wherein:
the foldable attachment secures the steering assembly in a drive position when in the unfolded position;
the foldable attachment secures the steering assembly in a separate, stowed position when in the folded position; and
a rack assembly, comprising:
a support structure defining a support region; and
a mounting apparatus extending from a first side of the support structure and that is operable to attach the rack assembly proximate to one of the front wheel or the rear wheel of the portable conveyance, wherein the mounting apparatus defines an interlock structure that can interlock in a first position and a second, separate position;

wherein when the interlock structure is interlocked in the first position, and the front wheel and the rear wheel of the portable conveyance are on a flat surface, the rack assembly is positioned such that the support region, relative to the flat surface, is above the wheel to which the rack assembly is proximately attached; and when the interlock structure is interlocked in the second position and the foldable attachment secures the steering assembly in the folded position, the rack assembly is positioned such that the support region, relative to the flat surface, is below the wheel to which the rack assembly is proximately attached when the portable conveyance rests in an upright position with the support region of the rack assembly serving as a base.

2. The portable conveyance of claim 1, wherein:

the rack assembly further comprises a first rack wheel and a second rack wheel along an axis of rotation that runs parallel to the support region and parallel to an axis of rotation of the wheel to which the rack assembly is proximately attached; and when the steering assembly is in the folded position, the portable conveyance may be tilted from the upright position to a towing position, and in the towing position the portable conveyance may roll on the flat surface by the first rack wheel and the second rack wheel.

3. The portable conveyance of claim 2, wherein the first rack wheel is positioned on a first side of the wheel to which the rack assembly is proximately attached, and the second rack wheel is positioned on a second side of the wheel to which the rack assembly is proximately attached.

4. The portable conveyance of claim 3, wherein the interlock structure comprises a rotational attachment that rotationally attaches the rack assembly relative to one of the front wheel or the back wheel so that the rack assembly rotates from the first interlock position to the second interlock position.

5. The portable conveyance of claim 1, wherein the interlock structure comprises a rotational attachment that rotationally attaches the rack assembly relative to one of the front wheel or the back wheel so that the rack assembly rotates from the first interlock position to the second interlock position.

* * * * *

UNITED STATES PATENT AND TRADEMARK OFFICE
CERTIFICATE OF CORRECTION

PATENT NO. : 12,157,536 B2
APPLICATION NO. : 18/175167
DATED : December 3, 2024
INVENTOR(S) : Robert McCormick et al.

Page 1 of 1

It is certified that error appears in the above-identified patent and that said Letters Patent is hereby corrected as shown below:

In the Claims

Column 8, Line 50, Claim 1 – after "end" insert -- of --.

Signed and Sealed this
Twenty-eighth Day of January, 2025

Coke Morgan Stewart
*Acting Director of the United States Patent and Trademark Office*